United States Patent
Jamison et al.

(10) Patent No.: US 8,194,922 B2
(45) Date of Patent: Jun. 5, 2012

(54) SYSTEM AND METHODS FOR DYNAMICALLY GENERATING EARTH POSITION DATA FOR OVERHEAD IMAGES AND DERIVED INFORMATION

(75) Inventors: Todd Jamison, South Riding, VA (US);
Paul Bresnahan, Centreville, VA (US);
Mark Yeshnik, Herndon, VA (US)

(73) Assignee: Observera, Inc., Chantilly, VA (US)

( * ) Notice: Subject to any disclaimer, the term of this patent is extended or adjusted under 35 U.S.C. 154(b) by 914 days.

(21) Appl. No.: 12/171,763

(22) Filed: Jul. 11, 2008

(65) Prior Publication Data

US 2009/0074254 A1    Mar. 19, 2009

Related U.S. Application Data

(60) Provisional application No. 60/949,620, filed on Jul. 13, 2007.

(51) Int. Cl.
*G06K 9/46* (2006.01)
*G06K 9/00* (2006.01)
*G06K 9/54* (2006.01)

(52) U.S. Cl. .................. 382/103; 382/190; 382/305

(58) Field of Classification Search .................. 382/100, 382/154, 190, 191, 103, 305
See application file for complete search history.

(56) References Cited

U.S. PATENT DOCUMENTS

| 7,310,440 B1 * | 12/2007 | Dolloff ......................... 382/154 |
| 2006/0022980 A1 | 2/2006 | Donovan et al. |
| 2008/0133554 A1 | 6/2008 | Lee et al. |

FOREIGN PATENT DOCUMENTS

KR    10-2005-0009811 A    1/2005

OTHER PUBLICATIONS

International Bureau of WIPO. International Preliminary Report on Patentability, Intl. Application PCT/US09/50245. Jan. 20, 2011.

* cited by examiner

*Primary Examiner* — Daniel Mariam
(74) *Attorney, Agent, or Firm* — The Marbury Law Group PLLC (57) ABSTRACT

Distributed adaptive geopositioning includes an objective architecture for imagery geopositioning. The positioning is distributed to fulfill the need to perform accurate geopositioning whenever and wherever it is needed. The positioning is adaptive to implement the idea that geopositioning is a dynamic, not static, quality of geospatial intelligence, for which accuracy can be improved over time as more data is collected and ingested. Focus is placed on the need for improved geopositioning throughout all areas of geospatial intelligence exploitation, not just for specific products or tools. Legacy data is re-computed to align with the geopositioned imagery and also benefits from improved accuracy.

20 Claims, 4 Drawing Sheets

SYSTEM AND METHODS FOR DYNAMICALLY GENERATING EARTH POSITION DATA FOR OVERHEAD IMAGES AND DERIVED INFORMATION

CROSS REFERENCE TO RELATED APPLICATIONS

This application claims the benefit of Provisional Application No. 60/949,620 filed Jul. 13, 2007. The 60/949,620 application is incorporated by reference herein, in its entirety, for all purposes.

BACKGROUND AND SUMMARY

Digital geospatial production processes today are highly influenced by analog processes before computers. In general, they are digital versions of analog processes that fail to leverage technologies to process information digitally in a way conducive to modern computer environments.

The present state of the art in photogrammetric production utilizes product-centric approaches that focus on imagery collected with a fixed spatial and temporal extent. A typical flow is set forth below:

1) Imagery is collected. The imagery may go to one or more libraries for storage. These libraries are geographically separated, and may be network-topologically separated, as well. For instance, each commercial imagery provider has its own storage, and some imagery may be duplicated on Government libraries at various security levels. Each image will have image support metadata containing sensor model parameters and often error estimates.

2) Image measurements of tie-points and control points are made. Additional imagery must be accessed to measure tie-points and control points. Sometimes tie-points or control points have been previously measured on the imagery. These measurements are performed in "image space."

3) A photogrammetric triangulation using weighted least squares (WLS) adjustment is run. This adjusts the images for consistency and seamlessness over the project area.

4) Triangulation results are reviewed for quality. Triangulation is the process of improving the accuracy of imagery through measurements and mathematical computations. This is typically performed using a bundle block adjustment process.

5) Final adjustments are applied to imagery support metadata and tie point coordinates. This can be in the form of changes to initial or previous sensor model parameter values or in the form of additional sensor or geometry model parameters. The process often includes the update of error estimate information for the sensor model parameters and the tie points used in the triangulation process.

6) Derivative products are made. These include stereo products, such as Digital Point Positioning Data Base (DPPDB), monoscopic products, such as Controlled Image Base (CIB) and other orthorectified products, elevation data, such as Digital Terrain Elevation Data (DTED), and feature vector data.

Derivative products are made in "ground space" that represents the 3-D world. Elevation data can be extracted directly in 3-D using stereo imagery products. Orthorectified products are inherently 2-D and provide only horizontal ground coordinates although elevation data in the vertical dimension is required for the orthorectification process. Feature vector data can be extracted directly in 3-D using stereo imagery or in 2-D from orthorectified products with the third dimension applied from elevation data.

For the present state of the art, non-imagery derivative product data consists fundamentally of ground points with only ground point coordinates. Elevation data posts or Triangulated Irregular Network (TIN) points are points. Feature vector data consists of individual points and multiple-vertex lines, polygons, and 3-D volumes. The vertexes are points that connect the lines, polygons, and volumes. For the present state of the art, only the 2-D or 3-D ground coordinates of the points and vertexes of extracted data are stored. Even though imagery is used in the extraction process, line and sample coordinates of the points and vertexes as they appear in the image are not recorded.

A fair amount of manual labor is required in the production process. Automated methods still require editing by humans. In the current state of the art, these edits are performed only in "ground space" and the edits are not recorded or maintained for re-use and for use in "image space" with subsequent images. For instance, Digital Elevation Model (DEM) editing may involve tasks such as flattening lakes, ensuring that rivers run monotonically downstream, and defining breaklines on ridge tops. Even though these edits involve feature vector-like extractions of lines and polygons, they are not retained and so they cannot be re-applied to a DEM re-computed over the same area. Even if they were retained, only "ground space" coordinates are available and the process does not involve the connection of edits in "image space" to subsequent images that may be used to refine or update the DEM over the area.

The "product approach" is inherently inefficient. For a particular product, the imagery is triangulated using only the imagery collected for that product, such as 1° by 1° cells, then the information used to perform the triangulation (referred to herein as a part of "heritage information") is either 1) not retained in the first place, 2) is gathered but thrown away upon process completion, or 3) is kept in the hands of a select few in one small part of the overall process. This heritage information has value and can be combined with other similar information to improve the accuracy of "product" imagery, as well as future and past imagery collected over the same area.

"Products" are produced with a certain accuracy requirement—either a product specification or via more stringent production guidelines. The areas typically are collected in a systematic fashion both spatially and temporally, and the images are grouped by convenient product sets, such as a 1°×1° cells, quadrangles, or counties. All of the imagery is collected for the "product" set before the rest of the workflow is started. Tie-points are collected in well-defined and regular overlap areas and triangulation (optionally with ground control points) is performed on all of the imagery in the product set at one time.

At periodic intervals, new imagery is collected and the entire production process is repeated. This is because, in the present state of the art, only the ground coordinates for the feature vectors and DEMs from the previous production iteration over the area are stored. The linkages from the image measurements through the triangulation process to product derivation and extraction are not maintained. There is no choice but to start the process anew to create new ground coordinates for image products, feature vectors, and DEMs. Either the old data is completely discarded and replaced with the new data, or an attempt is made to conflate the ground coordinates from the older and new data, which is a difficult process. New imagery is collected and an entirely new triangulation is performed. New derived data such as DEMs and feature vectors are re-extracted from the new imagery. Although some extraction can be automated, it still requires labor-intensive manual intervention. Current methods do not leverage off the labor put into the production of previous DEMs and vectors, including their editing. Instead labor is expended to re-extract vectors and DEMs for the same features and areas. The older vectors and DEMs are either discarded or even more labor is expended attempting to conflate the older and newer data. These architectures are highly centralized by nature, with one organization performing almost all of the work for a given product set. Quality control of these products relies upon processes designed to achieve confidence that the output is better than the requirement or specification rather than to achieve best accuracy and to quantify that accuracy.

What is needed is a system that values not only the raw image data and information extracted from the raw image data but the "heritage" information as well. This system can maintain the connection between "image space" and "ground space" not just for the images, but also for all information extracted from the images, through the heritage information. Extracted information includes elevation data, feature vector data, edits performed to these derived data, and the object-oriented properties, sometimes called attributes, of the derived data. The line and sample coordinates for everything extracted must be maintained with linkages to the image identifiers of the images used. The image identifiers are also linked to the imagery sensor model parameters for each image. Error estimate information is maintained for all line/sample coordinates, image sensor model parameters, and ground points and is used in the triangulation process. This allows re-derivation of geospatial coordinates at any time in the future.

When necessary, photogrammetric weighted least squares (WLS) re-adjustments are run. The imagery is re-triangulated in the traditional sense, but all other extracted information is also placed in the WLS process as an expansion of the traditional triangulation process in order to re-compute the ground coordinates of the extracted information. In this way, all extracted information, including DEM edits, is carried along with re-adjustments of the imagery. In a way, feature vector points and vertexes can function as additional tie points for computational purposes, but they continue to be treated as feature vectors in the traditional sense after the re-adjustment.

Additional constraints can be included based upon feature object properties in the WLS adjustments. For instance, constraints can be used to ensure corners of rooftops remain squared for the computation of ground coordinates for the roof corners.

Heritage information can also consist of known relationships between visible and non-visible objects. By way of example but not limitation, non-visible underground electrical lines can be geometrically connected to visible ground-level transformer boxes. When the transformer boxes are adjusted by the process, the position of the underground electrical line is updated by maintaining the known relative geometric relationship between the boxes and the line.

The new system supports a single geospatial object-oriented database that spans time and space. Features or objects acquire identity that is not tied to a single geographic point, but is instead associated with the best available knowledge about where they are located at any point in time. By way of example, but not limitation, instead of a single light house being stored redundantly in separate databases—as a point in a nautical database, as a vertical obstruction in an aeronautical database, and as a detailed 3-D volume in a harbor database—there is one instance of that light house in one database with linkage information to all images on which that light house was measured. With the re-adjustment process, even though that light house is measured on multiple images, only one set of ground coordinates is present for each extracted vertex of that light house. And, the error estimates of those vertexes are computed using the covariance propagated through the re-adjustment process. If more accurate imagery is acquired, the coordinates and error estimates are both updated to reflect the new information.

In an embodiment, a distributed adaptive geopositioning system comprises datastores of source imagery data, extracted information, and heritage information that are accessible via a network. In another embodiment, the analysis of the image and the extraction process are automated. In yet another embodiment, an automated distributed adaptive geopositioning system is used to provide alerts when changes are detected in selected features within an area of interest.

DETAILED DESCRIPTION

For the purposes of this Application, the following terms have the meaning ascribed to them:

"Imagery data" means the raw data in pixel form that defines the image.

"Image information" means data about an image such as the date the image was taken, the sensor, vehicle, and platform used to capture the image, sensor model support data parameters, intrinsic error data, and an image identifier.

"Heritage information" means any information relevant to the computation of extracted information. This includes, but is not limited to, image pixel measurements and error estimates, and the record of DEM edits performed over an area.

"Extracted information" means information derived from one or more images through manual or automated means. This includes, but is not limited to, feature vectors consisting of individual ground points and vertexes of line, polygon, and 3-D volume features; DEM posts and DEM edits, such as breaklines, monotonic drainage lines, and polygons of constant elevation over lakes; ground coordinates of tie points; and error estimates of ground points and vertexes.

"DPPDB" is an acronym for Digital Point Positioning Data Base, a stereo-based secondary image product used to extract accurate 3-D coordinates for any objects identifiable within the stereo coverage.

"CIB" is an acronym for Controlled Image Base, a monoscopic orthorectified image product.

"NSG" is an acronym for National System for Geospatial-Intelligence, the collection of hardware, software, and communications networks that is used by the US Intelligence Community for geospatial information tasking, collection, processing, exploitation, and dissemination, and for which the functional manager is the NGA.

National Geospatial-Intelligence Agency (NGA) is an agency of the United States Government with the primary mission of collection, analysis, and distribution of geospatial intelligence (GEOINT) in support of national security.

GEOINT—"GEOspatial INTelligence;" an intelligence discipline in which imagery data and other geospatially-referenced data is used to describe, assess, and visually depict physical features and geographically referenced activities on the earth. GEOINT sources include imagery data and mapping data, whether collected by commercial satellite, government satellite or by other means, such as UAV (Unmanned Aerial Vehicle) or reconnaissance aircraft.

"Triangulation" means the process for the extension of horizontal and vertical control whereby the measurements of angles and/or distances on overlapping images are related in a spatial solution using the principles of a sensor model. The most common method is for frame perspective optical cameras, but other sensor models and modalities, such as pushbroom, whiskbroom, and Synthetic Aperture Radar (SAR), apply in the spatial solution using their respective modeling principles and the specific types of sensor models are not meant here as a limitation.

"Registration" means the process of aligning the features of one image with those of another, either through direct alignment of their corresponding pixels or through indirect alignment, such as by adjusting the image information so that the pixels can be aligned during processing.

"Control Point" means an image identifiable point or mark on or near the ground of known position or elevation, or both, for which precise and accurate positioning information has been acquired, such as through Global Positioning System (GPS).

"Tie-point" means an image identifiable point on or near the ground that appears in the overlap area between two or more images that serve to tie the overlapping images together in a photogrammetric triangulation adjustment, and for which the line and sample coordinates of the feature in the images is collected.

"Conflation" means the process of associating and aggregating information about the same objects or features in two different databases.

"User" means a human operator interacting with a computer program, or a computer program operating under the direct or indirect control of a human, or a computer program operating autonomously. By way of example but not limitation, this includes automated feature extraction or automated target detection processes.

Figure 1:
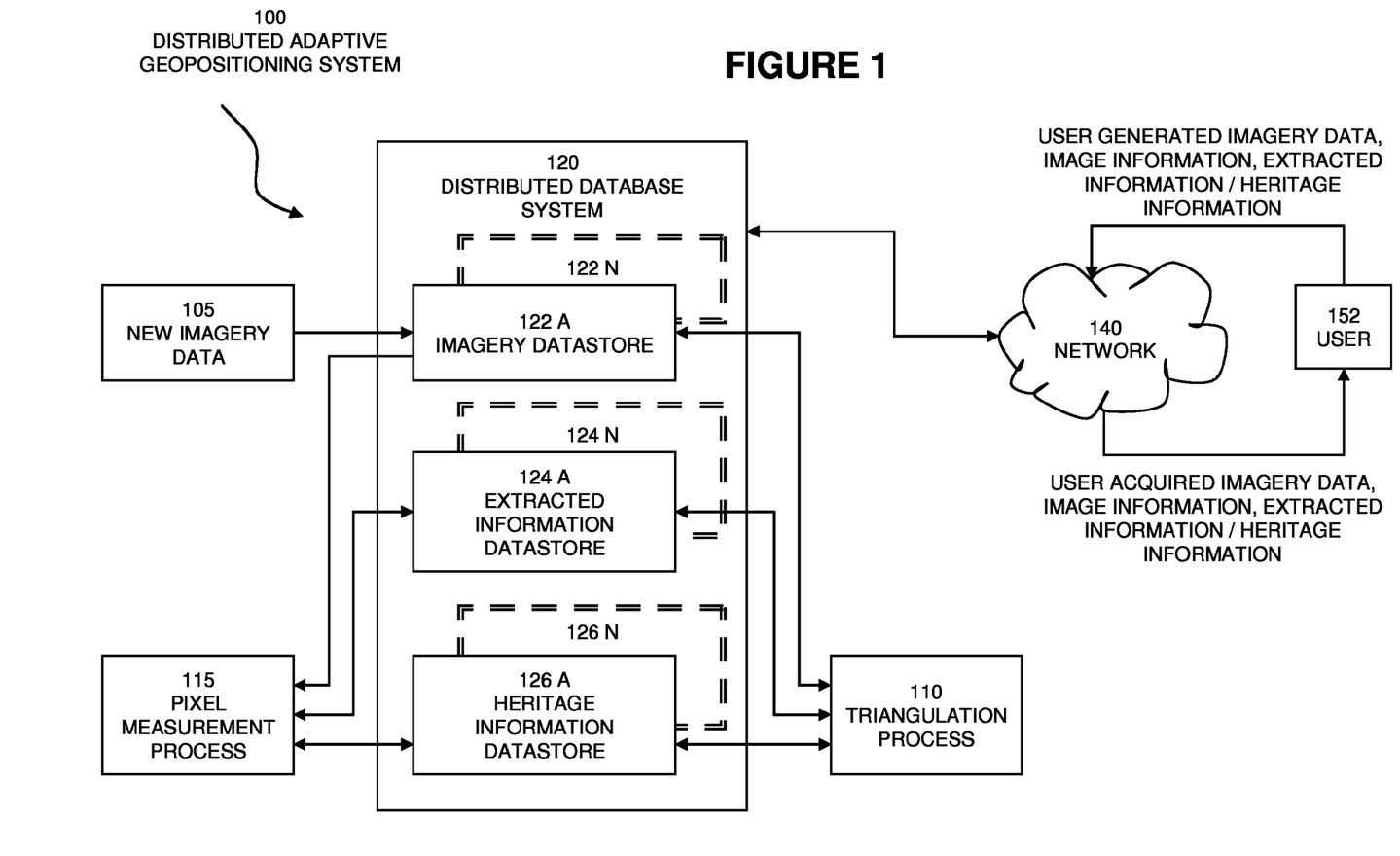
FIG. 1 illustrates a block diagram of a distributed adaptive geopositioning system according to an embodiment hereof.

FIG. 1 illustrates a block diagram of distributed adaptive geopositioning system 100 according to an embodiment hereof.

New imagery data is received 105 and stored in imagery datastore 122A along with image information. Imagery data may be received from any number of platforms, including without limitation, satellite imagery and airborne imagery, as well as different modalities such as SAR and Light Detection and Ranging (LIDAR) data.

By way of illustration and not as a limitation, image information comprises data about an image, such as the date and time the image was taken, the sensor, vehicle, and platform used to capture the image, sensor position and pointing data, intrinsic error data, and an image identifier.

New and old imagery data is retrieved from the imagery datastore 122A and directed to a pixel measurement process 115 that produces both extracted information, as for example, point location geographic coordinates, and heritage information, as for example point image location line and sample coordinates. The extracted information is received and stored in extracted information datastore 124A. The heritage information is received and stored in heritage information datastore 126A.

As illustrated in FIG. 1, imagery datastore 122A is one of "N" imagery datastores within distributed database system 120, extracted information datastore 124A is one of "N" extracted information datastores within distributed database system 120, and heritage datastore 126A is one of "N" heritage information datastores within distributed database system 120. By way of example but not limitation, elements of the imagery datastore 122A, the extracted information datastore 124A, and the heritage information datastore 126A may be commingled as part of a relational or object-oriented database system and need not be implemented as separate entities within the database or database system.

As previously noted, current geopositioning systems are result or "product" oriented, such that much of the information that is used to produce a result is either not saved or not maintained in a form that can be shared with multiple users. In this embodiment, distributed adaptive geopositioning system 100 retains such information as "heritage information." Heritage information comprises all information relevant to the computation of extracted information. By way of illustration and not as a limitation, heritage information relating to a selected point produced by a pixel measurement process 115 may include image information, line and sample information in the image of the point, the tie-points and/or control points measured, and the image identifiers of other images used to triangulate the selected point. The heritage information for points on one image may be linked to multiple images through the image identifiers.

When needed, a triangulation process 110 retrieves imagery information, extracted information and heritage information from the databases 122A, 124A and 126A, respectively. The triangulation process 110 uses the imagery information, extracted information and heritage information for tie-points, ground control points, and possibly other extracted features to perform a block bundle adjustment. The block bundle adjustment may include the entire database or some subset of the database. The triangulation process 110 stores the updated information into the respective databases 122A, 124A and 126A.

A user 152 accesses the distributed database system 120 via a network 140. In an embodiment, the network 140 is the Internet, however this is not meant as a limitation. Network 140 may be a wireless or wired network, an optical network, a public or private network, and may comprise any number of sub-networks that each may be wired, wireless, optical, public or private.

User 152 requests and receives user acquired imagery data, image information, extracted information, and heritage information. The user may also process the received information to produce "new" extracted information. User generated imagery data, image information, extracted information and heritage information are returned to the distributed database system 120 and stored as accumulated information for access by other users.

In one implementation of the system illustrated in FIG. 1, standards are established for uniform extraction of tie-point and control-point data. The pixel measurement process 115 and triangulation process 110 are applied using the standardized methodology to new imagery data. The tie-point and control-point geographic coordinates are stored within the extracted information datastore 124A. The associated heritage data, including the tie-point and control-point line and sample coordinates, is stored in the heritage information datastore 126A. User 152 may perform photogrammetric calculations using all relevant data regarding the user's point of interest. Reference data derived by the user is captured in the extracted information datastore 124A along with the heritage information associated with the user-produced extracted information.

The retention of heritage information from users allows for improved accuracy of all extracted information. For example, as more and more users identify tie-point locations, the accuracy of the location of such points improve. As the accuracy of tie-points improves, the distinction between a control-point and a tie-point becomes less meaningful, with highly imaged tie-points eventually achieving accuracies comparable to control-points.

Feature vector points and vertexes could be used as tie-points in addition to their traditional purpose as part of the feature vector database. This depends on the quality of the feature information as it is derived from the images. Their line/sample coordinates on images are recorded at the time of extraction, and they can be utilized and carried along in the re-adjustment process. As the tie-points and control-points improve the accuracy of the images' sensor model parameters, the accuracy trickles down to the feature vectors, DEM, and 3-D points that are inherently linked to the images through the extraction process.

The image identifier saved as an informational element in the image information links imagery data and image information to heritage information. This linkage allows a user to monitor the distributed adaptive geopositioning system 100 for updates in points of interest.

Figure 2:
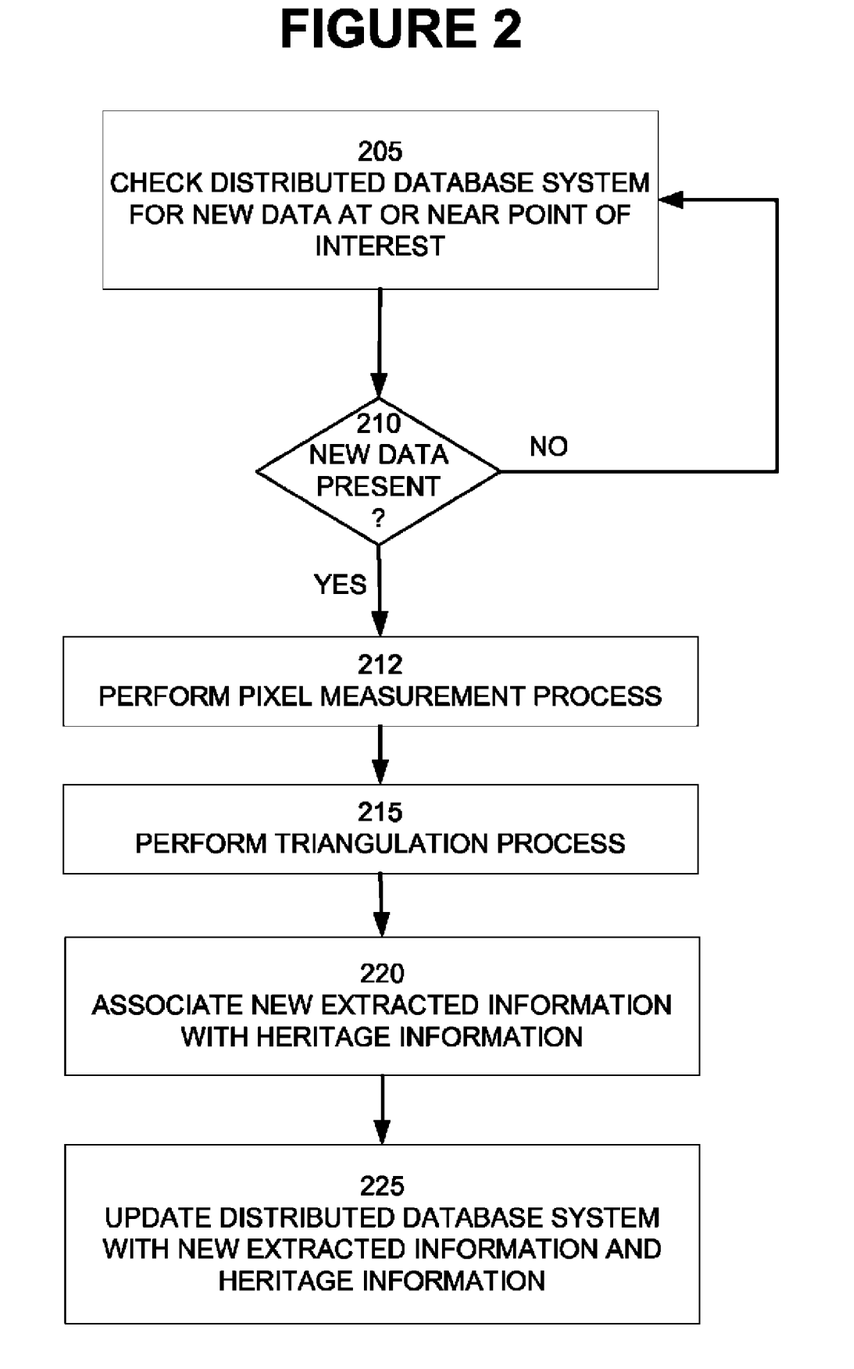
FIG. 2 illustrates a flow diagram of data monitoring process according to an embodiment hereof.

FIG. 2 illustrates a flow diagram of data monitoring process according to an embodiment hereof. The distributed database system (FIG. 1, 120) is checked to determine whether new imagery data relating to a point of interest has been acquired 205. If new imagery data has not been acquired 210, the distributed database system is checked again 205. If new imagery data has been acquired 210, pixel measurement 212 is performed on the new imagery data creating new extracted information and new heritage information. The new imagery data is then triangulated 215 with other imagery data, which can include both existing and other new imagery data. As a result, new imagery information, in the form of updated image support data, new extracted information, and new heritage information are generated. The new extracted information and the new heritage information generated are associated with each other 220. The distributed database system (FIG. 1, 120) is updated with the new extracted information and the new heritage information 225.

It should be noted that application of the data monitoring process over time will improve the accuracy of the extracted information stored in distributed database system (FIG. 1, 120).

As previously noted, legacy geopositioning systems are result or "product" centric. In legacy systems, accuracy is a characteristic of a product. That is, a user receives the accuracy defined by the supplier whether the accuracy is required by the user or not.

Figure 3:
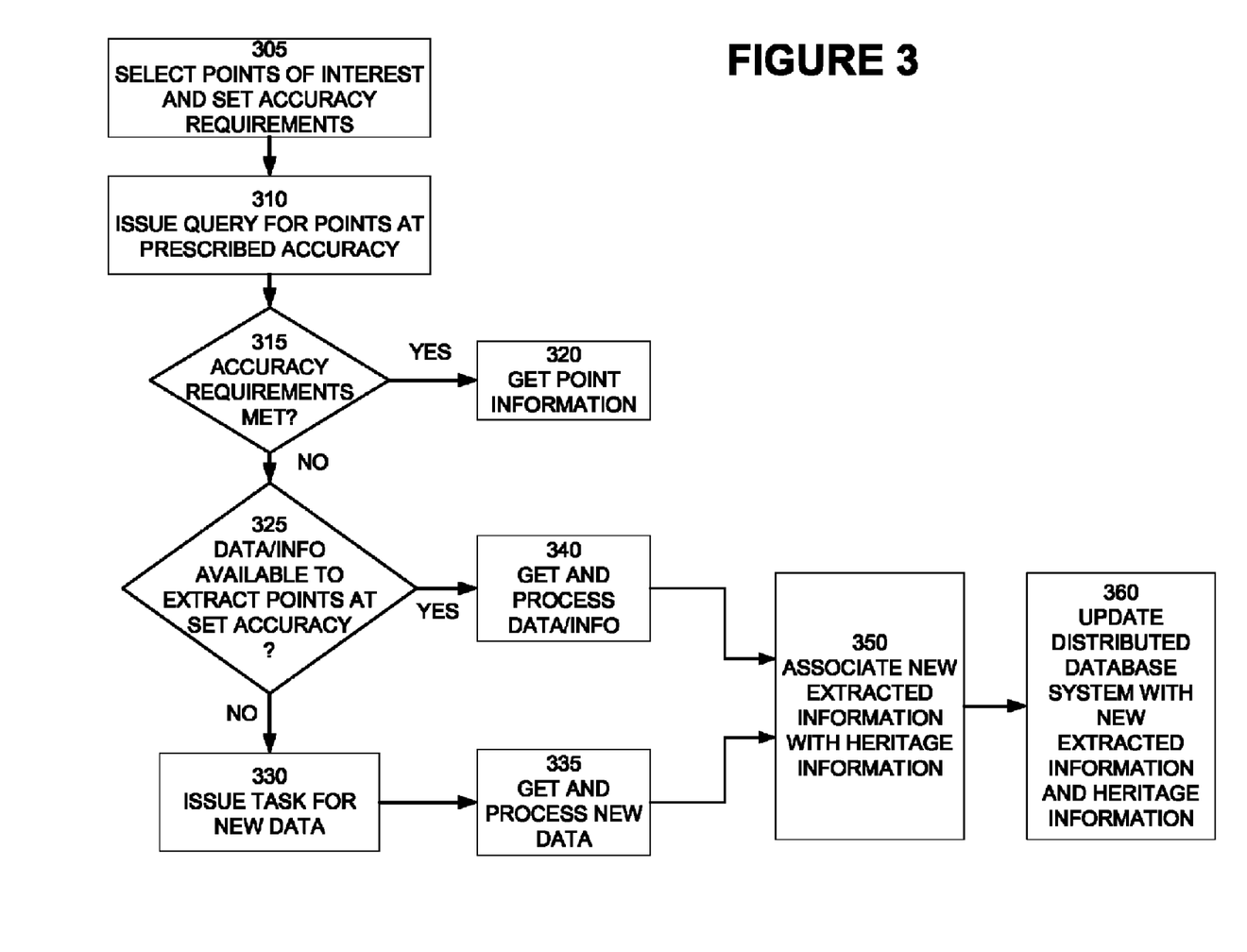
FIG. 3 illustrates a flow diagram of a data retrieval process according an embodiment.

FIG. 3 illustrates a flow diagram of a data retrieval process according to an embodiment. A user selects points of interest having a specified accuracy requirement 305. The user issues a query to the distributed database system (FIG. 1, 120) to acquire information regarding the points of interest. A determination is made whether information meeting the prescribed accuracy is available from the distributed database system (FIG. 1, 120) 315. If so, the point information is acquired 320. If not, a determination is made whether data and information is available on the distributed database system (FIG. 1, 120) to extract point information at the prescribed accuracy 325. If so, the information and/or data is acquired and processed 340 and new extracted information and heritage information is generated. By way of illustration and not as a limitation, tie-point sets and/or the control point data may be re-triangulated using all of the latest information to improve the accuracy of the points of interest. The new extracted information and the new heritage information are associated with each other 350. The distributed database system (FIG. 1, 120) is updated with the new extracted information and the new heritage information 360.

If it is determined that data and information is not available on the distributed database system (FIG. 1, 120) to extract point information at the prescribed accuracy 325, a task for new imagery data is issued 330. The specific imagery collection geometry is influenced by the accuracy need. The new imagery data is acquired 335 and processed and new extracted information and heritage information is generated. The new extracted information and the new heritage information are associated with each other 350. The distributed database system (FIG. 1, 120) is updated with the new extracted information and the new heritage information 360.

Figure 4:
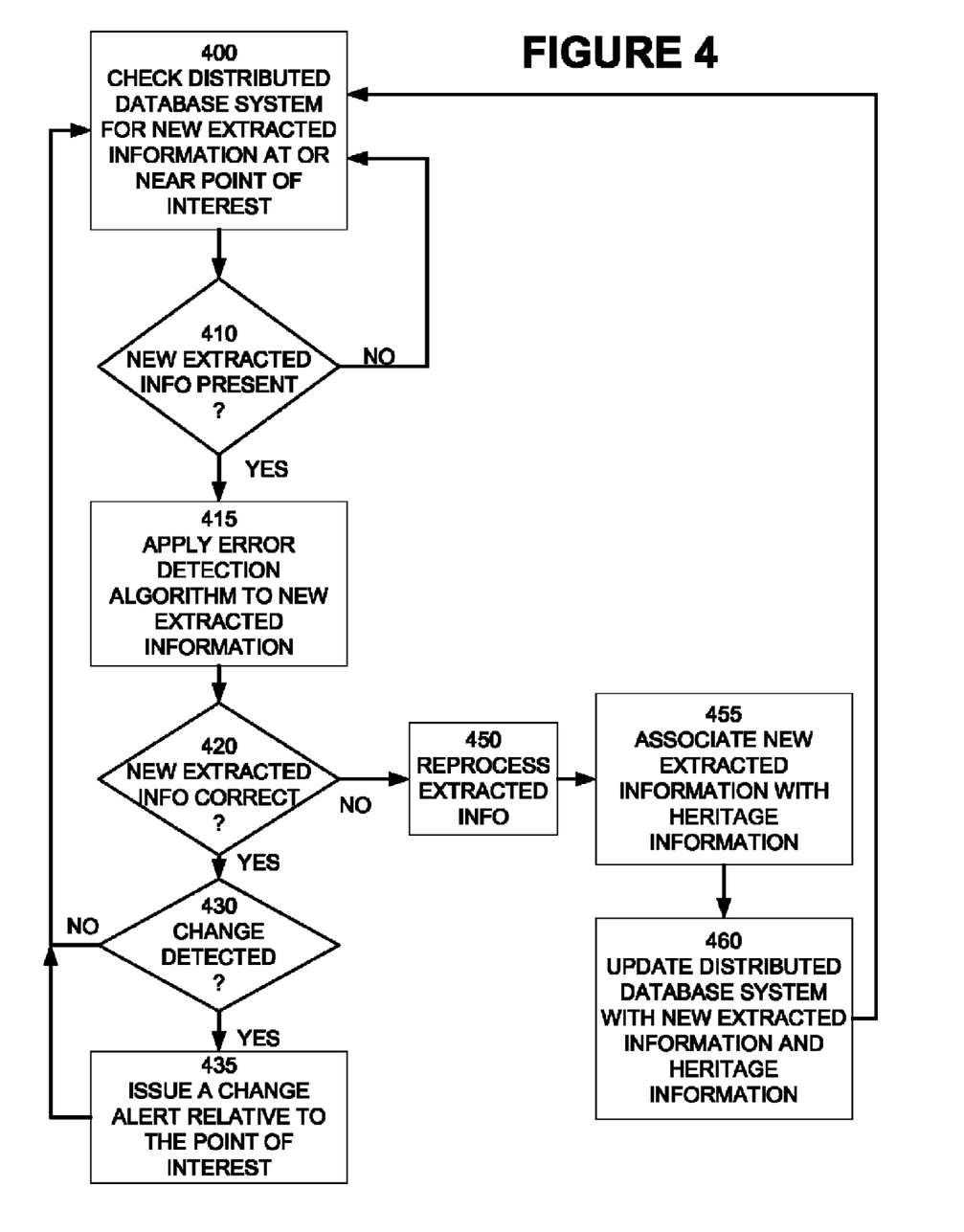
FIG. 4 illustrates a flow diagram of a change determination process according to an embodiment.

The distributed adaptive geopositioning system 100 (see, FIG. 1) as previously described may be used to identify changes in selected points of interest. FIG. 4 illustrates a flow diagram of a change determination processes according to an embodiment. The distributed database system (FIG. 1, 120) is checked for new extracted information at or near a point of interest 400. A determination is made as to whether new extracted information is present 410. If not, the distributed database system (FIG. 1, 120) is checked for new extracted information 400.

If new extracted information is found, an error detection algorithm is applied to the new extracted information 415. In an embodiment, the error detection algorithm detects information "outliers," that is information that appears inconsistent with stored extracted information relating to the point of interest or points near the point of interest. In this embodiment, in order to determine whether the outlier represents a computation error or new data representing a change in the point of interest, the heritage information relating to the point of interest and its extracted information is consulted. In an embodiment, the extracted information may be recalculated. In another embodiment, reference points in the imagery data may be verified.

A determination is made whether the new extraction information is correct 420. If the new extracted information is deemed to be incorrect, the extracted information is reprocessed 450 and new extracted information and heritage information is generated. The new extracted information and the new heritage information are associated with each other 455. The distributed database system (FIG. 1, 120) is updated with the new extracted information and the new heritage information 460. The distributed database system (FIG. 1, 120) is again checked for new extracted information at or near a point of interest 400.

If the new extracted information is deemed to be correct, a determination is made whether the new extracted information represents a "change" from previous information about the point of interest 430. In an embodiment, criteria are applied to any differences between the most current set of extracted information relating to the point of interest and one or more previously determined sets of extracted information. By way of illustration and not as a limitation, the criteria may include absolute changes in position coordinates, changes in position coordinates relative to another point in the image, and a rate of change of the position coordinates. If, based on the change criteria, a "change" in the extracted information is not detected, the distributed database system (FIG. 1, 120) is again checked for new extracted information at or near a point of interest 400. If, based on the change criteria, a "change" in the extracted information is detected, a change alert is issued 435 and the distributed database system (FIG. 1, 120) is again checked for new extracted information at or near a point of interest 400.

The distributed adaptive geopositioning system 100 (see, FIG. 1) as previously described anticipates that features in imagery data will be recalculated multiple times. In an embodiment, a feature is defined as an object comprising rules that determine how the object is to be treated. For example, a building object may be assigned rules requiring the roof corners to remain squared, that the roof remain level, and that the sides remain perpendicular to the roof even though the individual building vertices are re-adjusted from source imagery measurements. As another example, a river vector object can be constrained to be monotonic so that it will always flow down hill after each computation.

The distributed adaptive geopositioning system 100 (see, FIG. 1) may be implemented to improve the handling of DEMs. Most standards such as Digital Terrain Elevation Data (DTED) require elevation posts to be at fixed integer horizontal increments, e.g., every 1-arcsecond for DTED2. The readjustment of elevation posts is a necessity in order to keep them consistent with continually-improving source images. Distributed adaptive geopositioning addresses the need to keep elevation posts at fixed horizontal increments in order to support compatibility with exploitation systems. Distributed adaptive geopositioning also incorporates mechanisms to preserve information about the editing done to DEMs. Such editing is needed, for instance, to ensure that rivers run downstream. Unlike legacy processes, distributed adaptive geopositioning stores and re-applies this important editing information to newly-adjusted elevation posts to maintain quality.

The distributed adaptive geopositioning system 100 (see, FIG. 1) may be implemented to improve the handling of known object-to-object relationships in terms of ground coordinates, distances, and directions to improve object geopositioning.

It will be understood by those skilled in the art that the present invention may be embodied in other specific forms without departing from the scope of the invention disclosed and that the examples and embodiments described herein are in all respects illustrative and not restrictive. Those skilled in the art of the present invention will recognize that other embodiments using the concepts described herein are also possible. Further, any reference to claim elements in the singular, for example, using the articles "a," "an," or "the," is not to be construed as limiting the element to the singular.

What is claimed is:

1. A processor-implemented method for improving the accuracy of a location of an object, the method comprising:
   receiving by a processor first image data and first image information for an area of interest, wherein the area of interest encompasses the object;
   performing by the processor a first pixel measurement process on the first image data using the first image information, wherein the first pixel measurement process produces first extracted information and first heritage information, wherein the first heritage information comprises information used to compute the first extracted information and wherein the first extracted information comprises a measure of a first calculated location of the object;
   storing by the processor the first extracted information in an extracted information datastore;
   storing by the processor the first heritage information in a heritage information datastore;
   receiving and storing second image data and second image information by the processor for the area of interest;
performing by the processor a second pixel measurement process on the second image data using the second image information and the first heritage information, wherein the second pixel measurement process produces second extracted information and second heritage information wherein the second extracted information comprises a measure of a second calculated location of the object;
   storing by the processor the second extracted information in the extracted information datastore;
   storing by the processor the second heritage information in the heritage information datastore; and
   determining by the processor a measure of a current calculated location of the object as determined from the first and second calculated locations of the object.

2. The method of claim 1, wherein the first image information comprises one or more physical characteristics of a first image sensor used to obtain the first image data and wherein the second image information comprises one or more physical characteristics of a second image sensor used to obtain the second image data.

3. The method of claim 2, wherein the one or more physical characteristics of the first and second image sensors are selected from the group consisting of uncertainty covariance information for a sensor model and sensor model parameters, a replacement sensor model, replacement sensor model parameters, uncertainty covariance information for the replacement sensor model, and uncertainty covariance information for the replacement sensor model parameters.

4. The method of claim 1 wherein the first image information comprises a mathematical representation of the first and second image sensors.

5. The method of claim 4 wherein the mathematical representation of the first and second image sensors is taken from the group consisting of a replacement sensor model, replacement sensor model parameters, uncertainty covariance information for the replacement sensor model, and uncertainty covariance information for the replacement sensor model parameters.

6. The method of claim 1, wherein the first and second extracted information are selected from the group consisting of a tie-point, a ground control point, a feature point, a feature vertex, a feature line, a feature area, a feature volume, an elevation point, an elevation breakpoint, a line of constant elevation, a drainage line, and a polygonal area of constant elevation.

7. The method of claim 1, wherein the first and second extracted information comprise an uncertainty estimate associated with current Earth coordinate estimates.

8. The method of claim 1 further comprising:
   acquiring by the processor additional image data that includes the area of interest;
   acquiring by the processor additional image information from the additional image data;
   acquiring by the processor additional extracted data derived from the additional image data;
   acquiring by the processor additional heritage information for the additional extracted data; and
   determining by the processor a revised measure of the current calculated location of the object using the additional image data, the additional image information, the additional image extracted data and the additional image heritage data.

9. The method of claim 1, wherein heritage information is selected from the group consisting of an identifier of an image from which the heritage information was extracted, image pixel measurements for the extracted information, and error estimates.

10. The method of claim 1 wherein heritage information comprises image pixel coordinates of extracted elements for more than one image.

11. The method of claim 1, wherein the heritage information includes an uncertainty estimate for line and sample coordinates.

12. The method of claim 1 wherein determining by the processor a measure of a current calculated location of the object as determined from the first and second calculated locations of the object comprises:
    acquiring by the processor measurements of points within the area of interest; and
    triangulating by the processor the object in reference to the points using the acquired measurements.

13. The method of claim 1, wherein the first and second extracted information and the first and second heritage information are stored in a single database.

14. The method of claim 1, wherein the first and second extracted information and the first and second heritage information are stored across multiple databases connected by a network.

15. The method of claim 1 further comprising:
    receiving by the processor additional extracted information and additional heritage information;
    storing by the processor the additional extracted information in the extracted information database; and
    storing by the processor the additional heritage information in the heritage information database.

16. The method of claim 1 further comprising:
    checking by the processor on a periodic basis for new image data at or near the area of interest;
    performing by the processor a pixel measurement process on the object in the new image data in the area of interest;
    performing by the processor a triangulation on the object;
    associating by the processor new extracted information concerning the object with the heritage information;
    storing new extracted information concerning the object in the extracted information datastore; and
    storing new heritage information in the heritage information datastore.

17. The method of claim 16 further compromising:
    instructing by a processor to select at least one point of interest having a specified accuracy;
    issuing by the processor a first query to the extracted information datastore for image data for the at least one point of interest having the specified accuracy; and
    returning by the processor the extracted information concerning the at least one point of interest having the specified accuracy is stored in the database system.

18. The method of claim 16 further comprising:
    instructing by a processor to select at least one point of interest having a specified accuracy;
    issuing by the processor a first query to the extracted information datastore for image data for the at least one point of interest having the specified accuracy; and
    issuing by the processor a task for collection of new image data when the first query to the extracted information datastore for image data for the at least one point of interest having the specified accuracy cannot be met.

19. The method of claim 1 further comprising;
    a data store containing digital elevation model (DEM) edits;
    the processor accessing the DEM edits; and
    the processor using the DEM edits to recalculate the DEM values.

20. The method of claim 1 further comprising:
    a data store containing feature constraints for the object or group of objects;
    the processor accessing the feature constraints for the object or group of objects; and
    the processor using the feature constraints to limit how the location of the object or locations of the group of objects may be re-computed.

* * * * *